United States Patent
Kim

(10) Patent No.: US 12,141,839 B2
(45) Date of Patent: Nov. 12, 2024

(54) MEDIA PROVIDING METHOD, TERMINAL SYSTEM OF TAXI VEHICLE AND SERVER PERFORMING THE SAME

(71) Applicants: Hyundai Motor Company, Seoul (KR); Kia Corporation, Seoul (KR)

(72) Inventor: Sojeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/572,969

(22) Filed: Jan. 11, 2022

(65) Prior Publication Data

US 2023/0024226 A1    Jan. 26, 2023

(30) Foreign Application Priority Data

Jul. 20, 2021 (KR) .................. 10-2021-0095088

(51) Int. Cl.
*G06Q 30/0251* (2023.01)

(52) U.S. Cl.
CPC .................. *G06Q 30/0265* (2013.01)

(58) Field of Classification Search
CPC combination set(s) only.
See application file for complete search history.

(56) References Cited

U.S. PATENT DOCUMENTS

| | | | |
|---|---|---|---|
| 2004/0112959 A1* | 6/2004 | Jun | G07C 5/008 235/384 |
| 2004/0119589 A1* | 6/2004 | French | G06Q 30/0267 340/539.11 |
| 2013/0325619 A1* | 12/2013 | Lile | G06Q 30/0207 705/14.64 |
| 2016/0125664 A1* | 5/2016 | Joo | G07B 15/06 705/13 |
| 2017/0091812 A1* | 3/2017 | Wong | G06Q 30/0253 |
| 2018/0357668 A1* | 12/2018 | Kanemoto | G06Q 30/0259 |

FOREIGN PATENT DOCUMENTS

| | | | | |
|---|---|---|---|---|
| JP | 2020144267 A | | 9/2020 | |
| KR | 20120040478 A | * | 2/2012 | ............ G06Q 50/40 |
| KR | 101505819 B1 | * | 1/2015 | ......... G06Q 30/0261 |
| KR | 20160046494 A | * | 4/2016 | ......... G06Q 30/0266 |
| KR | 20190054504 A | * | 5/2019 | ........... G06Q 20/145 |
| KR | 20200124433 A | | 11/2020 | |
| KR | 102225062 B1 | | 3/2021 | |
| KR | 102249082 B1 | * | 5/2021 | ............ G06Q 50/30 |
| WO | WO-2019011300 A1 | * | 1/2019 | ......... G06Q 30/0239 |
| WO | WO-2020105480 A1 | * | 5/2020 | ............ G06Q 50/30 |
| WO | WO-2020118273 A9 | * | 8/2020 | ......... G06Q 30/0265 |

* cited by examiner

*Primary Examiner* — Marie P Brady
(74) *Attorney, Agent, or Firm* — Slater Matsil, LLP

(57) ABSTRACT

An embodiment terminal system of a taxi vehicle includes a first terminal located in the taxi vehicle and configured to display media content provided from a server that provides a call/allocation service on a screen, wherein the media content displayed through the first terminal is varied based on whether a passenger in the taxi vehicle used the call/allocation service to board the taxi vehicle.

20 Claims, 9 Drawing Sheets

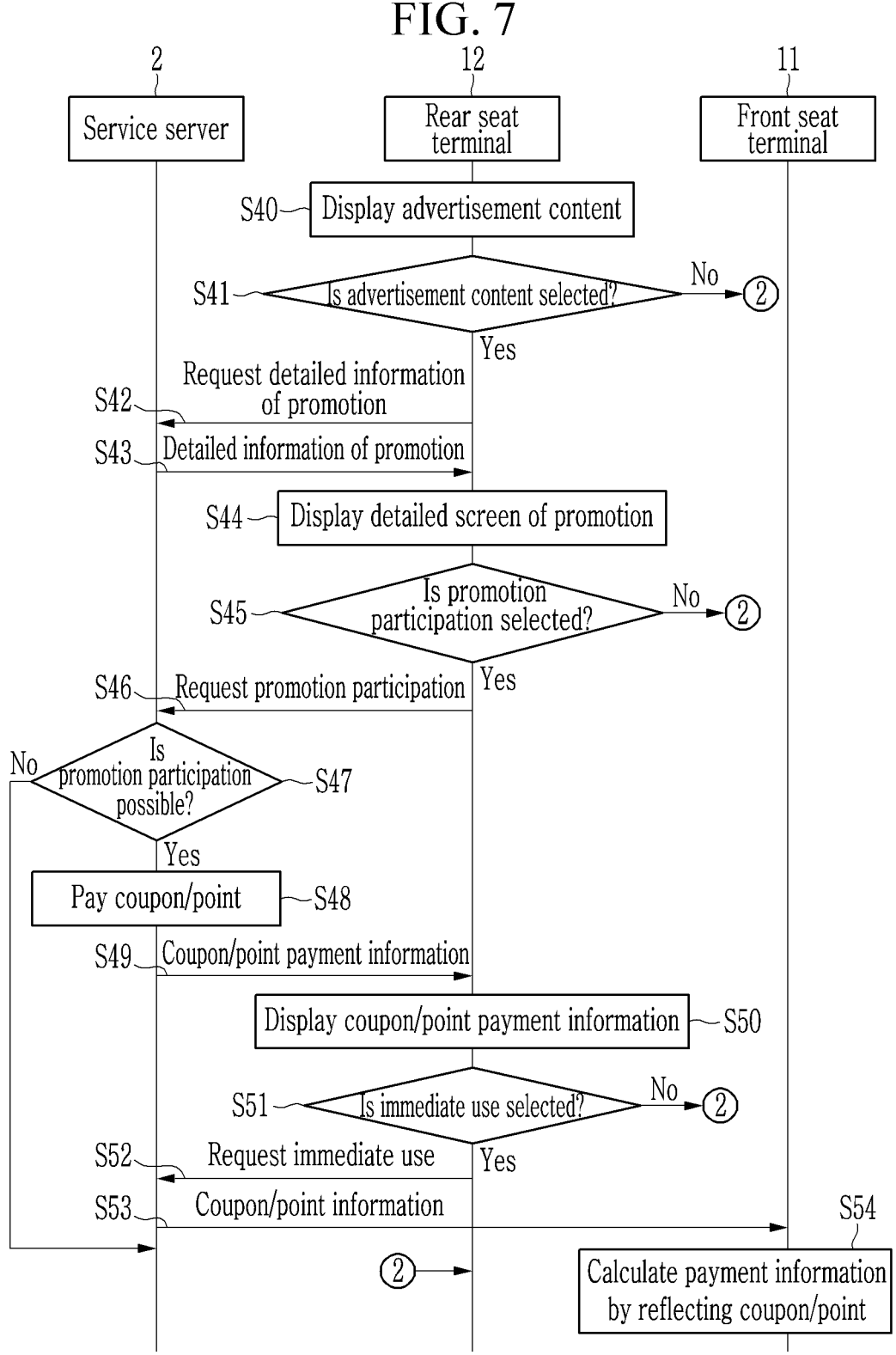

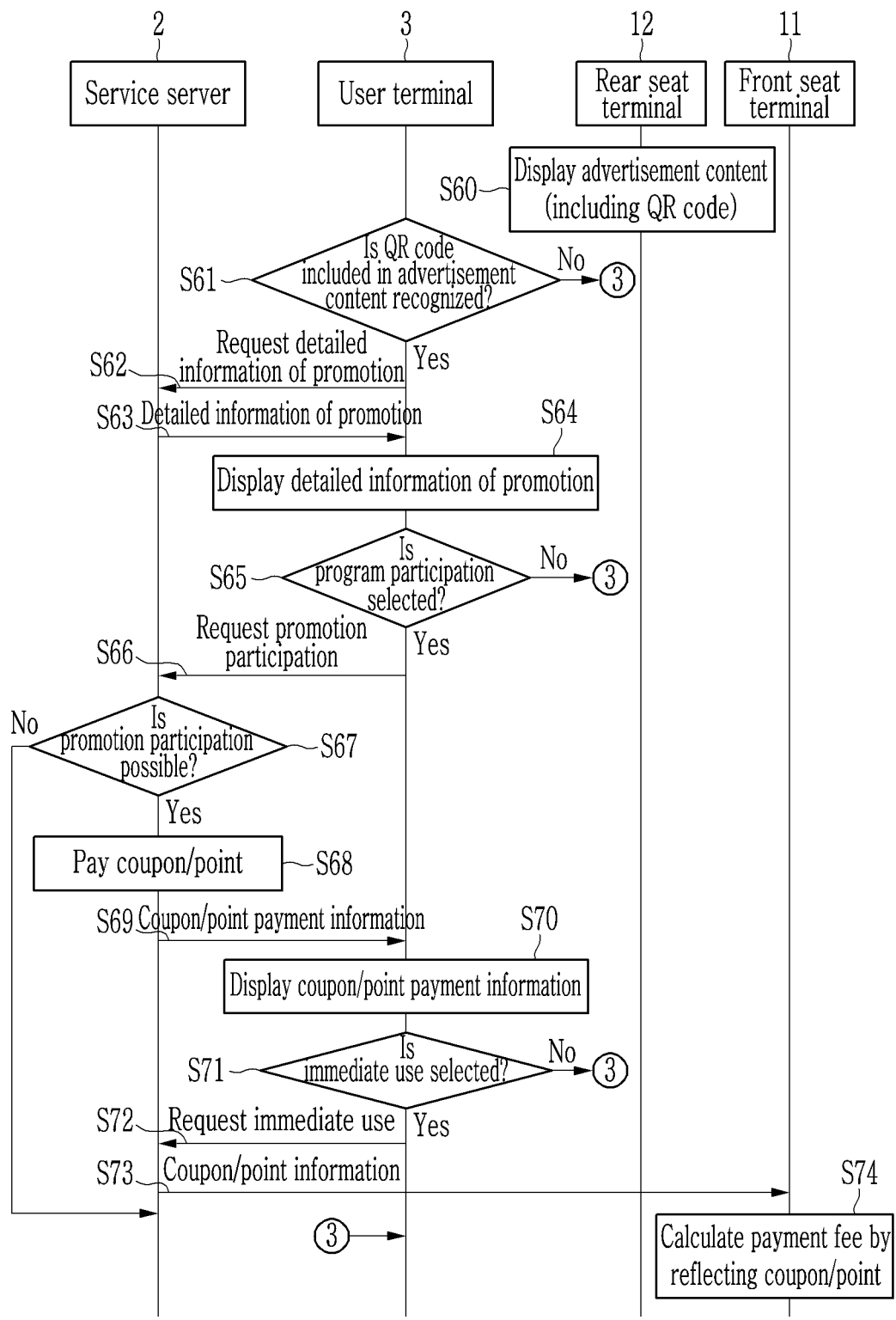

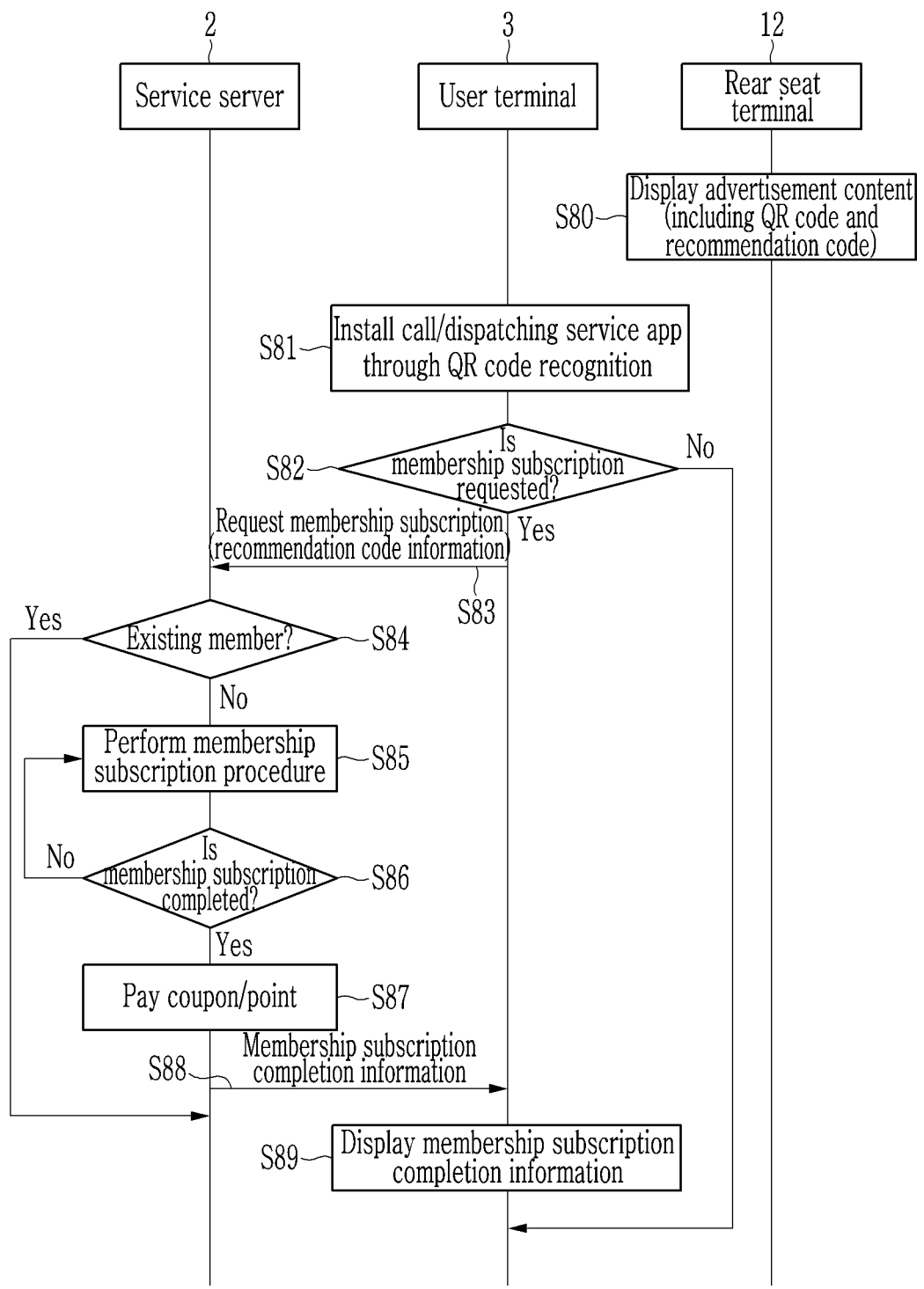

MEDIA PROVIDING METHOD, TERMINAL SYSTEM OF TAXI VEHICLE AND SERVER PERFORMING THE SAME

CROSS-REFERENCE TO RELATED APPLICATIONS

This application claims the benefit of Korean Patent Application No. 10-2021-0095088, filed on Jul. 20, 2021, which application is hereby incorporated herein by reference.

TECHNICAL FIELD

The present disclosure relates to a media providing method, a terminal system of a taxi vehicle and a server performing the same.

BACKGROUND

A taxi vehicle providing a taxi service is provided with a plurality of channels. For example, a call terminal for receiving and selecting a taxi call, a payment terminal for charging a driving fee, audio, video, navigation, a taxi meter, etc. may be provided in the taxi vehicle. While driving, a taxi driver may need to operate a plurality of channels. This may distract a taxi driver's attention and cause a traffic accident.

Recently, the number of taxi vehicles with an in vehicle infotainment (IVI) device equipped in a rear seat thereof is increasing in order to facilitate communication between a driver and passengers in the taxi vehicle and provide information related to driving of the taxi vehicle to the passengers.

The above information disclosed in this Background section is only for enhancement of understanding of the background of the invention, and therefore it may contain information that does not form the prior art that is already known to a person of ordinary skill in the art.

SUMMARY

Embodiments of the present invention provide a media providing method, a terminal system of a taxi vehicle and a server performing the same having advantages of providing media content suitable for a passenger's boarding type when media content is to be provided to passengers through a terminal located in a taxi vehicle. The media content can be an advertisement.

An exemplary embodiment provides a terminal system and a server for providing advertisements in a taxi vehicle.

According to an exemplary embodiment, the terminal system of the taxi vehicle may include a first terminal that is located in the taxi vehicle and displays media content provided from a server providing a call/allocation service on a screen. The media content displayed through the first terminal may vary depending on whether a passenger in the taxi vehicle used the call/allocation service to board the taxi vehicle.

The terminal system may further include a second terminal that is located in the taxi vehicle, receives a call request from the server, and manages allocation of the taxi vehicle according to the reception of the call request.

When the allocation for the taxi vehicle is determined by the server, the second terminal may receive call information including departure place and destination information from the server, and identify whether the passenger in the taxi vehicle used the call/allocation service to board the taxi vehicle depending on whether the call information is received.

The first terminal may display a first media content related to service use of the call/allocation service on the screen when the passenger in the taxi vehicle used the call/allocation service to board the taxi vehicle.

When the server determines the allocation of the taxi vehicle in response to the call request, the first terminal may receive the first media content from the server.

The first media content may include information on a promotion including a discount event related to the use of the call/allocation service, a coupon payment event, or a point payment event.

The first terminal may display a second media content related to membership subscription of the call/allocation service on the screen when the passenger in the taxi vehicle does not use the call/allocation service to board the taxi vehicle.

The second media content may include information on a member subscription guide for the call/allocation service or promotion related to membership subscription of the call/allocation service.

The second terminal may display a plurality of selection buttons for determining a basic fare on the screen. The first terminal may display the media content on the screen when a selection of any one of the plurality of selection buttons is detected by the second terminal.

When the selection of any one of the plurality of selection buttons is detected by the second terminal in a state in which a business mode of the taxi vehicle is set to an empty car mode, the first terminal may display the second media content related to the membership subscription of the call/allocation service on the screen.

When the selection of any one of the plurality of selection buttons is detected by the second terminal in a state in which the taxi vehicle is not allocated by the server, the first terminal may display the second media content related to the membership subscription of the call/allocation service on the screen.

When the selection of any one of the plurality of selection buttons is detected by the second terminal, the first terminal may change to an activated state and display the media content.

The second terminal may receive the media content from the server, and when the first terminal is activated, transmit the received media content to the first terminal.

The first terminal may be located in a rear seat of the taxi vehicle, and the second terminal may be located in a front seat of the taxi vehicle.

Another embodiment provides a server providing a call/allocation service including a storage device that stores a first media content related to service use of a call/allocation service and a second media content related to membership subscription of the call/allocation service, and a control device that provides the first media content or the second media content to terminals located in taxi vehicles. The control device may provide the first media content to a terminal of a taxi vehicle which is allocated, in response to a call request received from a user, and provide the second media content to a terminal of a taxi vehicle in a non-allocated state.

The control device may provide the second media content to the terminal of the taxi vehicle which is not allocated, when a request for media content is received from the corresponding taxi vehicle.

Yet another exemplary embodiment provides a media providing method of a taxi vehicle including receiving, by a first terminal located in the taxi vehicle, media content provided from a server providing a call/allocation service, and displaying, by the first terminal, the media content on a screen. The media content displayed through the first terminal may vary depending on whether a passenger in the taxi vehicle used the call/allocation service to board the taxi vehicle.

The receiving may include receiving, by the first terminal, a first media content related to service use of the call/allocation service when the allocation for the taxi vehicle is determined by the server. The displaying may include displaying, by the first terminal, the first media content on the screen.

The media providing method may further include receiving, by a second terminal located in the taxi vehicle, a call request from the server, when detecting an acceptance input for the call request, transmitting, by the second terminal, an allocation request to the server, when the taxi vehicle is allocated by the server in response to the call request, receiving, by the second terminal, the first media content from the server, and transmitting, by the second terminal, the first media content to the first terminal.

The first media content may include information on a promotion including a discount event related to the use of the call/allocation service, a coupon payment event, or a point payment event.

The receiving may include receiving, by the first terminal, a second media content related to a membership subscription for the call/allocation service when a passenger boards while the taxi vehicle is roaming.

The second media content may include information on a member registration guide for the call/allocation service or promotion related to membership subscription of the call/allocation service.

The media providing method may further include displaying, by a second terminal located in the taxi vehicle, a plurality of selection buttons for determining a basic fare on a screen; and activating, by the second terminal, the first terminal when detecting a selection of any one of the plurality of selection buttons.

The media providing method may further include receiving, by the second terminal, a second media content related to membership subscription of the call/allocation service from the server when detecting the selection of any one of the plurality of selection buttons in a state in which a business mode of the taxi vehicle is set to an empty car mode, and transmitting, by the second terminal, the second media content to the first terminal. The displaying may include displaying, by the first terminal, the second media content on the screen.

The media providing method may further include receiving, by the second terminal, the second media content related to the membership subscription of the call/allocation service from the server when detecting the selection of any one of the plurality of selection buttons in a state in which the taxi vehicle is not allocated by the server, and transmitting, by the second terminal, the second media content to the first terminal. The displaying may include displaying, by the first terminal, the second media content on the screen.

In the media providing method, the first terminal may be located in a rear seat of the taxi vehicle, and the second terminal may be located in a front seat of the taxi vehicle.

According to exemplary embodiments, it is possible to provide media content suitable for a passenger's boarding method.

BRIEF DESCRIPTION OF THE DRAWINGS

FIG. 7 is a diagram illustrating a method in which a passenger boarding a taxi vehicle participates in a promotion of a service server using a call/allocation service according to an exemplary embodiment.

FIG. 8 is a diagram illustrating a method in which a passenger boarding a taxi vehicle participates in a promotion of a service server using a call/allocation service according to another exemplary embodiment.

FIG. 9 is a diagram illustrating a method for a user to subscribe to a service server as a member according to an exemplary embodiment.

Figure 1:
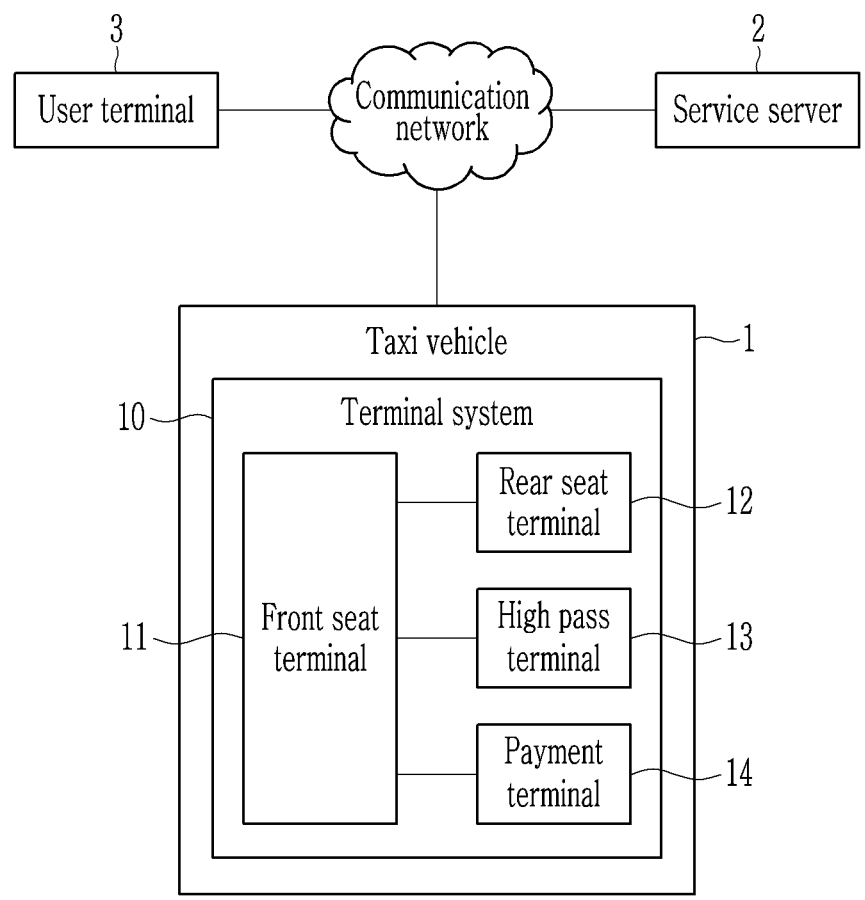
FIG. 1 is a diagram schematically illustrating a media providing system according to an exemplary embodiment.

The following elements may be used in connection with the drawings to describe embodiments of the present invention.

1: Taxi vehicle
10: Terminal system
11: Front seat terminal
111: Communication device of front seat terminal
112: Storage device of front seat terminal
113: Input device of front seat terminal
114: Display device of front seat terminal
115: Control device of front seat terminal
115-1: App meter module
115-2: Call/allocation app module
115-3: Navigation app module
115-4: Controller
12: Rear seat terminal
121: Communication device of rear seat terminal
122: Storage device of rear seat terminal
123: Input device of rear seat terminal
124: Display device of rear seat terminal
125: Control device of rear seat terminal
13: High pass terminal
14: Payment terminal
2: Service server
21: Communication device of service server
22: Storage device of service server
221: User information DB
222: Vehicle information DB
223: Call/allocation information DB
224: Media information DB
23: Control device of service server
231: User management unit
232: Vehicle management unit
233: Call/allocation management unit
234: Media management unit
3: User terminal

DETAILED DESCRIPTION OF ILLUSTRATIVE EMBODIMENTS

Hereinafter, exemplary embodiments disclosed in the present specification will be described in detail with reference to the accompanying drawings, but identical or similar components are given the same and similar reference numerals, and overlapping descriptions thereof will be omitted.

Terms "module" and "unit" for components used in the following description are used only to easily make the disclosure. Therefore, these terms do not have meanings or roles that distinguish from each other in themselves. Further, when it is decided that a detailed description for the known art related to the present disclosure may obscure the gist of the present disclosure, the detailed description thereof will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including ordinal numbers such as 'first', 'second', and the like, may be used to describe various components. However, these components are not limited by these terms. The terms are used only to distinguish one component from another component.

It is to be understood that when one component is referred to as being "connected to" or "coupled to" another component, one component may be connected directly to or coupled directly to another component or be connected to or coupled to another component with the other component interposed therebetween. On the other hand, it should be understood that when one element is referred to as being "connected directly to" or "coupled directly to" another element, it may be connected to or coupled to another element without the other element interposed therebetween.

It will be further understood that terms "include" or "have" used in the present specification specify the presence of features, numerals, steps, operations, components, parts, or combinations thereof, but do not preclude the presence or addition of one or more other features, numerals, steps, operations, components, parts, or combinations thereof.

A term "~part", "~er/or", "module", "means", or the like, described in the specification means a unit of processing at least one function or operation and may be implemented by hardware or software or a combination of hardware and software.

FIG. 1 schematically illustrates an advertisement providing system according to an exemplary embodiment.

Referring to FIG. 1, the media providing system may include a terminal system 10, a service server 2, and a user terminal 3 interconnected by a communication network. The media can be an advertisement.

The terminal system 10 may include a plurality of terminals located in a taxi vehicle 1. The terminal system 10 may include a front seat terminal 11 located in a front seat of the taxi vehicle 1 and a rear seat terminal 12 located in a rear seat of the taxi vehicle 1. The terminal system 10 may further include a high pass terminal 13 and a payment terminal 14 connected to the front seat terminal 11.

The front seat terminal 11 is an in vehicle infotainment (IVI) device that is located within a distance where a driver may operate in the taxi vehicle 1 and performs functions related to driving of the taxi vehicle 1. For example, the front seat terminal 11 may perform an app meter function, a call/allocation function, a navigation function, and the like.

Figure 2:
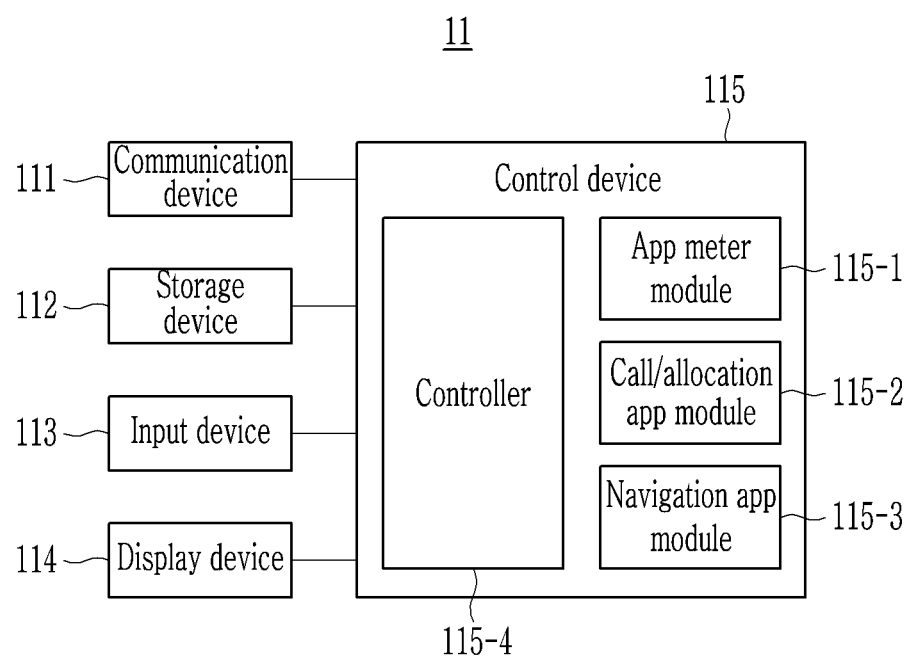
FIG. 2 is a diagram schematically illustrating a front seat terminal according to an exemplary embodiment.

FIG. 2 illustrates a schematic structural diagram of the front seat terminal 11.

Referring to FIG. 2, the front seat terminal 11 may include a communication device 11, a storage device 112, an input device 113, a display device 114, and a control device 115.

The communication device 111 may transmit/receive information between the front seat terminal 11 and an external device through wired/wireless communication. Here, the external device may include not only a device located inside the taxi vehicle 1, but also a device located outside the taxi vehicle 1 and connected through a communication network. For example, the communication device 11 may transmit/receive information between the front seat terminal 11 and the rear seat terminal 12, the high pass terminal 13, or the payment terminal 14 located in the taxi vehicle 1. Also, for example, the communication device 11 may transmit/receive information between the front seat terminal 11 and the service server 2 through the communication network.

The storage device 112 is a recording medium readable by a processor, and may store programs for the operation of the front seat terminal 11. For example, the storage device 112 may store a program for executing various applications (hereinafter, referred to as 'apps') for driving the taxi vehicle 1. Apps necessary for the driving of the taxi vehicle 1, such as an app meter, a call/allocation app, a navigation app, and a high pass app, may be installed and executed in the front seat terminal 11. The storage device 112 may store programs for executing the apps installed in the front seat terminal 11 in this way.

The storage device 112 may store various information/data processed in the front seat terminal 11.

The input device 113 is an interface device that detects a driver's manipulation of the front seat terminal 11. The input device 113 may include an input device such as a touch sensor (or a touch pad) that detects a driver's touch manipulation, a push button, and a jog wheel.

The display device 114 may display various information processed in the front seat terminal 11. For example, the display device 114 may display a user interface (UI) or a graphic user interface (GUI) constituting an app screen of an app executed on the front seat terminal 11.

The display device 114 may be integrated with the touch sensor of the input device 113 to constitute a touch screen. In this case, the touch screen may operate as an interface device that displays various information on the screen and receives a user input generated by the driver's touch manipulation.

The control device 115 may control the overall operation of the front seat terminal 11. The control device 115 may include a plurality of app modules 115-1 to 115-3, and a controller 115-4. The plurality of app modules 115-1 to 115-3 may include an app meter module 115-1, a call/allocation app module 115-2, a navigation app module 115-3, and the like. Each of the app modules 115-1, 115-2, and 115-3 may be executed under the control of the controller 115-4. That is, the controller 115-4 may receive a control input requesting execution of a specific app through the input device 113 or may execute an app module of the corresponding app when an event requiring the execution of the specific app occurs.

The app meter module 115-1 may perform a function of the app meter. That is, the app meter module 115-1 may perform a function of calculating a driving fee of the taxi vehicle 1 based on a traveling distance of the taxi vehicle 1 on which the front seat terminal 11 is mounted.

The app meter module 115-1 may display selection buttons, such as an 'empty car' button, a 'pay' button, an 'out-of-town' button, a 'downtown' button, and a 'surcharge' button, on the screen of the front seat terminal 11 through the display device 114. These selection buttons may be configured as touch buttons, and may be selected by a driver's touch manipulation. The selection buttons displayed on the screen by the app meter module 115-1 may be selected differently depending on the business mode (empty car mode, boarding reservation mode, passenger boarding mode, etc.) of the taxi vehicle 1.

Among the selection buttons, the 'downtown' button and the 'out-of-town' button are buttons for selecting the basic fare of the taxi vehicle 1. When a passenger boards the taxi vehicle 1, the driver may select (or touch) the 'downtown' button or the 'out-of-town' button on the screen of the front seat terminal 11 together with the start of driving. When the 'downtown' button or the 'out-of-town' button is selected by the driver, the app meter module 115-1 may continuously acquire a traveling distance, a traveling time, etc. of the taxi vehicle 1 from the time at which the selection of the 'downtown' button or the 'out-of-town' button is detected. The app meter module 115-1 may acquire positional information of the taxi vehicle 1 through a global positioning system (GPS)-based position sensor, and may acquire the traveling distance of the taxi vehicle 1 based on the acquired positional information.

The app meter module 115-1 may set a business mode of the taxi vehicle 1 to a passenger boarding mode when the selection of the 'downtown' button or the 'out-of-town' button is detected. To activate the rear seat terminal 12, the app meter module 115-1 may also transmit information (hereinafter referred to as 'traveling start information') indicating that the taxi vehicle 1 has started traveling by the passenger boarding to the rear seat terminal 12.

The app meter module 115-1 may continuously calculate the driving fee according to the traveling distance, the traveling time, etc. of the taxi vehicle 1. When the 'downtown' button is selected at the start of driving, the app meter module 115-1 may calculate a driving fee based on a downtown basic fare. When the 'out-of-town' button is selected at the start of driving, the app meter module 115-1 may calculate a driving fee based on an out-of-town basic fare. The app meter module 115-1 may display information on the calculated driving fee on the screen of the front seat terminal 11 through the display device 114.

The app meter module 115-1 may transmit information on the driving fee calculated by the app meter module 115-1 to the rear seat terminal 12 so that the driving fee may be displayed on the screen of the rear seat terminal 12.

When the taxi vehicle 1 arrives at a destination, the driver may select the 'pay' button on the screen of the front seat terminal 11. When the 'pay' button is selected, the app meter module 115-1 may determine the payment fee based on the final driving fee. When information on an additional charge is input from a driver through the input device 113, the app meter module 115-1 may determine a payment fee by adding the additional charge to the final driving fee. When the taxi vehicle 1 travels on a toll road, the app meter module 115-1 may receive information on the toll fee (or high pass fare) from the high pass terminal 13, and may determine the payment fee by adding the toll fee to the final driving fare. When the payment fee is determined, the app meter module 115-1 may display payment fee information on the screen of the front seat terminal 11.

When the payment fee is determined, the app meter module 115-1 may transmit the payment fee information to the rear seat terminal 12 so that the information on the payment fee may be displayed on the screen of the rear seat terminal 12.

The app meter module 115-1 may transmit the payment fee information to the payment terminal 14 for billing. When the payment fee is a payment fee for the call allocation driving, the payment fee information calculated by the app meter module 115-1 is to be transmitted to the service server 2 through the call/allocation app module 115-2.

The driver may select the 'empty car' button when a passenger gets off the taxi vehicle 1. When the selection of the 'empty car' button is detected, the app meter module 115-1 may stop calculating the driving fee and reset the traveling distance, the traveling time, and the driving fee of the taxi vehicle 1 for the next business.

When the selection of the 'empty car' button is detected, the app meter module 115-1 may set the business mode of the taxi vehicle 1 to the empty car mode. When the business mode of the taxi vehicle 1 is changed to the empty car mode, the app meter module 115-1 may transmit, to the rear seat terminal 12, information notifying that the taxi vehicle 1 has entered the empty car mode to deactivate the rear seat terminal 12.

The call/allocation app module 115-2 may manage reception of a call request for the taxi vehicle 1 and allocation accordingly. To this end, the call/allocation app module 115-2 may communicate with the service server 2 that provides the call/allocation service (or call taxi service) of taxi vehicles through the communication device 11.

The call/allocation app module 115-2 may receive call request information of a user (passenger) from the service server 2. When the call request information is received, the call/allocation app module 115-2 may display the call request information on the screen of the front seat terminal 11 through the display device 114. The call/allocation app module 115-2 may display an 'acceptance' button to which an acceptance function for the call request is mapped together with call request information on the screen of the front seat terminal 11. The driver may accept the received call request by selecting the 'acceptance' button. When the call request is accepted by the driver, the call/allocation app module 115-2 may transmit information requesting allocation (hereinafter, referred to as 'allocation request information') in response to the call request to the service server 2. The allocation request information may further include a vehicle number of the taxi vehicle 1, current positional information, driver information (e.g., driver's name, phone number, photo, etc.). When the allocation for the taxi vehicle 1 is determined by the service server 2, the call/allocation app module 115-2 may receive the allocation acceptance information from the service server 2. The allocation acceptance information may include a user's call information, that is, positional information on a user's departure place and destination, or the like. In addition, the call/allocation app module 115-2 may set the business mode of the taxi vehicle 1 to a boarding reservation mode as the allocation of the taxi vehicle 1 is determined by the service server 2.

When the allocation acceptance information is received, the call/allocation app module 115-2 may transmit the positional information of the passenger's departure place included in the allocation acceptance information to the navigation app module 115-3 to guide a route to a passenger's departure place. In addition, when the call/allocation app module 115-2 starts driving after the taxi vehicle 1 picks up a passenger, the navigation app module 115-3 may transmit the passenger's destination positional information to the navigation app module 115-3 for route guidance to the passenger's destination.

When the allocation for the taxi vehicle 1 is determined by the service server 2, the call/allocation app module 115-2 may receive media content related to the corresponding call/allocation service from the service server 2. Even when a passenger boards during the general roaming business of the taxi vehicle 1, the call/allocation app module 115-2 may receive the media content related to the call/allocation service from the service server 2. The media content received from service server 2 in the state where the service server 2 allocates the taxi vehicle 1 in response to the call request received from a user and the media content received from service server 2 in a state where the taxi vehicle 1 is not allocated in response to any call request may include different media content. After the allocation of the taxi vehicle 1 is determined for the user's call request, the media content received from service server 2 may include media content for a promotion (e.g., a discount event, a point payment event, a coupon payment event, etc.) for a service provider to maintain an existing member who is using a call/allocation service. After the passenger boards the taxi vehicle 1 by the general roaming business, the media content received from the service server 2 may include media content that guides a service app download of a call/allocation service or a membership subscription method or advertises promotions (e.g., a discount event, a point payment event, a coupon payment event, etc.) related to membership subscription.

The media content received from the service server 2 may be transmitted to the rear seat terminal 12 and displayed on the screen of the rear seat terminal 12.

The navigation app module 115-3 may perform a function of guiding a current location of the taxi vehicle 1 or a moving route to a destination. The navigation app module 115-3 may receive destination information through the input device 113 of the front seat terminal 11. The navigation app module 115-3 may receive destination information input by a passenger from the rear seat terminal 12. The navigation app module 115-3 may receive departure place positional information or destination positional information of the passenger acquired by the call/allocation app module 115-2 as destination information. When the destination information is acquired, the navigation app module 115-3 may derive route guidance information that includes a movement route for moving from the current location of the taxi vehicle 1 to the destination, an estimated arrival time corresponding thereto, and the like. Then, the navigation app module 115-3 may display the derived route guidance information on the screen of the front seat terminal 11 through the display device 114. In addition, the navigation app module 115-3 may transmit the route guidance information to the rear seat terminal 12 so that the derived route guide information may be displayed on the screen of the rear seat terminal 12.

Referring back to FIG. 1, the rear seat terminal 12 is positioned within a distance where a passenger boarding the rear seat of the taxi vehicle 1 may operate, and is an IVI device that performs a communication function between a driver and a passenger boarding the taxi vehicle 1. For example, the rear seat terminal 12 may provide a passenger with information related to taxi driving, and transmit information input from the passenger to the front seat terminal 11. The rear seat terminal 12 may perform a function of providing media information to a passenger.

Figure 3:
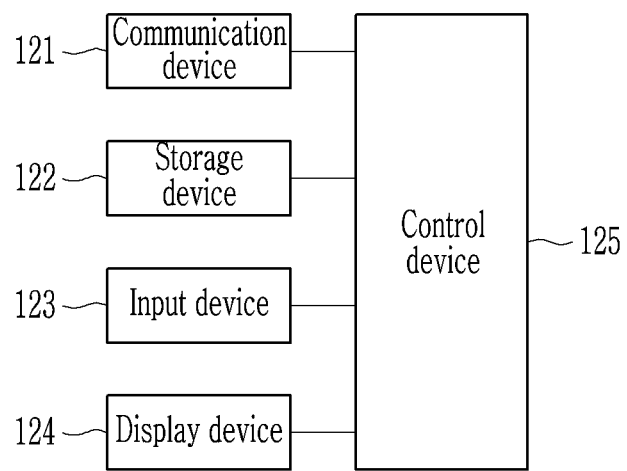
FIG. 3 is a diagram schematically illustrating a rear seat terminal according to an exemplary embodiment.

FIG. 3 illustrates a schematic structural diagram of the rear seat terminal 12.

Referring to FIG. 3, the rear seat terminal 12 may include a communication device 121, a storage device 122, an input device 123, a display device 124, and a control device 125.

The communication device 121 may transmit/receive information between the rear seat terminal 12 and an external device of the rear seat terminal 12 through wired/wireless communication. For example, the communication device 121 may transmit/receive information between the front seat terminal 11 and the rear seat terminal 12 located in the taxi vehicle 1. In addition, for example, the communication device 121 may transmit/receive information between the service server 2 and the rear seat terminal 12 connected through a communication network.

The storage device 122 is a recording medium readable by a processor, and may store programs for the operation of the rear seat terminal 12. The storage device 122 may store various data processed in the rear seat terminal 12.

The input device 123 is an interface device that detects a passenger's manipulation of the rear seat terminal 12. The input device 123 may include a touch sensor (or a touch pad), a push button, a jog wheel, and the like.

The display device 124 may display various information processed in the rear seat terminal 12. For example, the display device 124 may display information related to taxi driving on the screen of the rear seat terminal 12. Also, for example, the display device 124 may display the media content received from the front seat terminal 11 or the service server 2 on the screen of the rear seat terminal 12.

The display device 124 may be integrated with the touch sensor of the input device 123 to constitute a touch screen. In this case, the touch screen may operate as an interface device that displays various information on the screen and receives a control input generated by the driver's touch manipulation.

The control device 125 may control the overall operation of the rear seat terminal 12.

When the business mode of the taxi vehicle 1 is set to the empty car mode or the boarding reservation mode, the control device 125 may operate the rear seat terminal 12 in an inactive state (or a sleep state). When the business mode of the taxi vehicle 1 is set to the passenger boarding mode, the control device 125 may operate the rear seat terminal 12 in an active state (or a wake up state). To this end, the rear seat terminal 12 may receive information (e.g., traveling start information) for knowing the business mode of the taxi vehicle 1 from the front seat terminal 11.

The control device 125 may receive information related to the taxi driving from the front seat terminal 11 when the taxi vehicle 1 starts traveling for passenger transport. The control device 125 may display the information received from the front seat terminal 11 on the screen of the rear seat terminal 12 through the display device 124. The taxi driving related information received from the front seat terminal 11 may include, for example, taxi vehicle information, taxi driver information, driving fee information, route guidance information (including movement route, current positional information, estimated arrival time, etc.), etc.

The control device 125 may display an input window for receiving destination information from the passenger through the display device 124. When the destination information is input from the passenger through the destination input window, the control device 125 may transmit the input destination information to the front seat terminal 11.

The control device 125 may receive the media content from the front seat terminal 11 or the service server 2 and display the received media content on the screen of the rear seat terminal 12 through the display device 124.

Referring back to FIG. 1, the service server 2 is a server for providing a call/allocation service (or call taxi service) of taxi vehicles, and may manage call requests received from users in relation to the call/allocation service and allocation of taxi vehicles.

Figure 4:
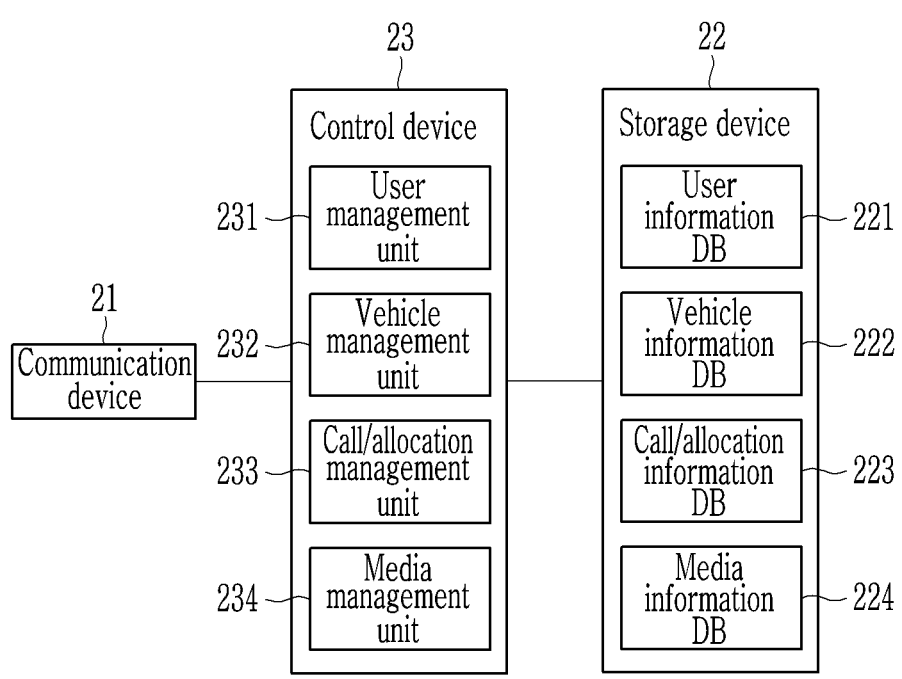
FIG. 4 is a diagram schematically illustrating a service server according to an exemplary embodiment.

FIG. 4 illustrates a schematic structural diagram of the service server 2.

Referring to FIG. 4, the service server 2 may include a communication device 21, a storage device 22, and a control device 23.

The communication device 21 may transmit/receive information between the user terminal 3 of users (or passengers) using a call/allocation service or the terminal system 10 of the taxi vehicles 1 through a communication network. For example, the communication device 21 may receive call request information from the user terminal 3 or transmit allocation information to the user terminal 3. Also, for example, the communication device 21 may transmit call request information or allocation acceptance information to the front seat terminal 11 of the terminal system 10 or receive allocation request information from the front seat terminal 11.

The storage device 22 may store various information processed by the service server 2. The storage device 22 may include a user information database (DB) 221, a vehicle information DB 222, a call/allocation information DB 223, and a media information DB 224 (e.g., advertisement media information database).

The user information DB 221 may store user information of users who use the call/allocation service of the service server 2. The user information may include a user name, a phone number, payment method information, promotion use information, and the like for each user. The promotion use information may include information on usage history and usage status for promotions (a discount event, a coupon payment event, a point payment event, etc.) provided in relation to the call/allocation service from the service server 2. The usage status information for the promotion may include details of coupons/points currently held by a user. The user information may further include a service usage history of the corresponding user. The service usage history is information on the history of the user using the call/allocation service, and may include a call request time, departure place and destination details set at the time of the call request, and the like. The user information may further include additional setting information indicating whether a user agrees to advertisement exposure, sharing of personal information, and the like.

The vehicle information DB 222 may store vehicle information of the taxi vehicles 1 registered in the service server 2. The vehicle information may include a vehicle number and driver information (name, phone number, photo, etc.) for each taxi vehicle 1. The vehicle information may further include driving state information for each taxi vehicle 1. The driving state information may include business mode information (boarding mode, empty car mode, boarding reservation mode, etc.) of each taxi vehicle 1, positional information, and the like. The vehicle information may further include additional setting information indicating whether or not to agree to the advertisement information exposure in the taxi vehicle 1.

The call/allocation information DB 223 may map and store allocation information corresponding to call requests received from the user terminals 3.

The information DB 224 may store advertisement information provided to the taxi vehicles 1 through the service server 2. The advertisement information may include media content for a promotion (e.g., a discount event, a point payment event, a coupon payment event, etc.) while a service provider maintains an existing member using a call/allocation service. The advertisement information includes media content that guides a service app download of a call/allocation service or a membership subscription method, or advertises promotions (e.g., a discount event, a point payment event, a coupon payment event, etc.) related to membership subscription.

The control device 23 may control the overall operation of the service server 2. The control device 23 may include a user management unit 231, a vehicle management unit 232, a call/allocation management unit 233, and a media management unit 234.

The user management unit 231 may process a membership subscription procedure of users using the call/allocation service. The user management unit 231 may store and manage information acquired while users join membership and information acquired while users use a call/allocation service in the user information DB 221.

The vehicle management unit 232 may process a vehicle registration procedure of the taxi vehicles 1. The vehicle management unit 232 may store and manage information acquired while the taxi vehicles 1 are registered and information acquired while the taxi vehicles 1 are allocated in the vehicle information DB 222.

When the call request is received from the user terminal 3, the call/allocation management unit 233 may transmit the call request to the terminal system 10 of the taxi vehicles 1 for allocation. In this case, the call/allocation management unit 233 may selectively transmit the call request only to the taxi vehicle 1 which may be located within a predetermined distance from the user's departure place or may arrive at the departure place within a predetermined time, based on the departure place positional information included in the call request and the positional information of the taxi vehicles 1.

The call/allocation management unit 233 may accept the allocation of the taxi vehicle 1 that has transmitted the allocation request information among the taxi vehicles 1 that have received the call request, and transmit the corresponding allocation acceptance information to the terminal system 10 of the corresponding taxi vehicle 1. In addition, the call/allocation management unit 233 may transmit the allocation information including the vehicle information on the taxi vehicle 1 for which allocation is accepted to the user terminal 3. The allocation information may include a vehicle number, driver information (name, phone number, photo, etc.), a current location, an estimated arrival time to a departure place, and the like of the allocated taxi vehicle 1.

A service operator that provides a call/allocation service may request a service registration for its own call/allocation service from a control operator (or control system) controlling the rear seat terminal 12 in order to expose media, such as an advertisement, through the rear seat terminal 12 in the taxi vehicle 1. The control operator (or control system) requested to register the service may examine the service. As a result of the examination, when the registration for the corresponding service is approved, the service operator may provide the media content to the rear seat terminal 12 of the taxi vehicle 1 through the service server 2.

The management unit 234 may perform a function of providing the media content to the terminal system 10 of the taxi vehicles 1 registered in the service server 2. The management unit 234 may transmit the media content to the terminal system 10 (e.g., the front seat terminal 11) of the taxi vehicle 1 for which the allocation is accepted when the allocation is accepted for the specific taxi vehicle 1. In this case, the media content transmitted to the front seat terminal 11 of the taxi vehicle 1 for which the allocation is determined is media content for maintaining existing members of the call/allocation service, and may include media content that advertises promotions related to service use of the call/allocation service.

When the provision of the media content is requested from the taxi vehicle 1 carrying a passenger as a general roaming business, the media management unit 234 may transmit the media content to the terminal system 10 (e.g., the front seat terminal 11) of the corresponding taxi vehicle 1. In this case, the media content transmitted to the front seat terminal 11 of the taxi vehicle 1 is media content for attracting new members of the call/allocation service, and may include media content that guides a service app download of a call/allocation service or a membership subscription method or advertises promotions related to membership subscription of the call/allocation service.

Hereinafter, exemplary embodiments of a method in the taxi vehicle 1, a method of participating in a promotion of a passenger boarding the taxi vehicle 1 using a call/allocation service, and a membership subscription method for a service server of a user using the taxi vehicle 1 will be described with reference to FIGS. 5 to 9. The methods described below with reference to FIGS. 5 to 9 may be performed by an advertisement providing system described above with reference to FIGS. 1 to 4.

Figure 5:
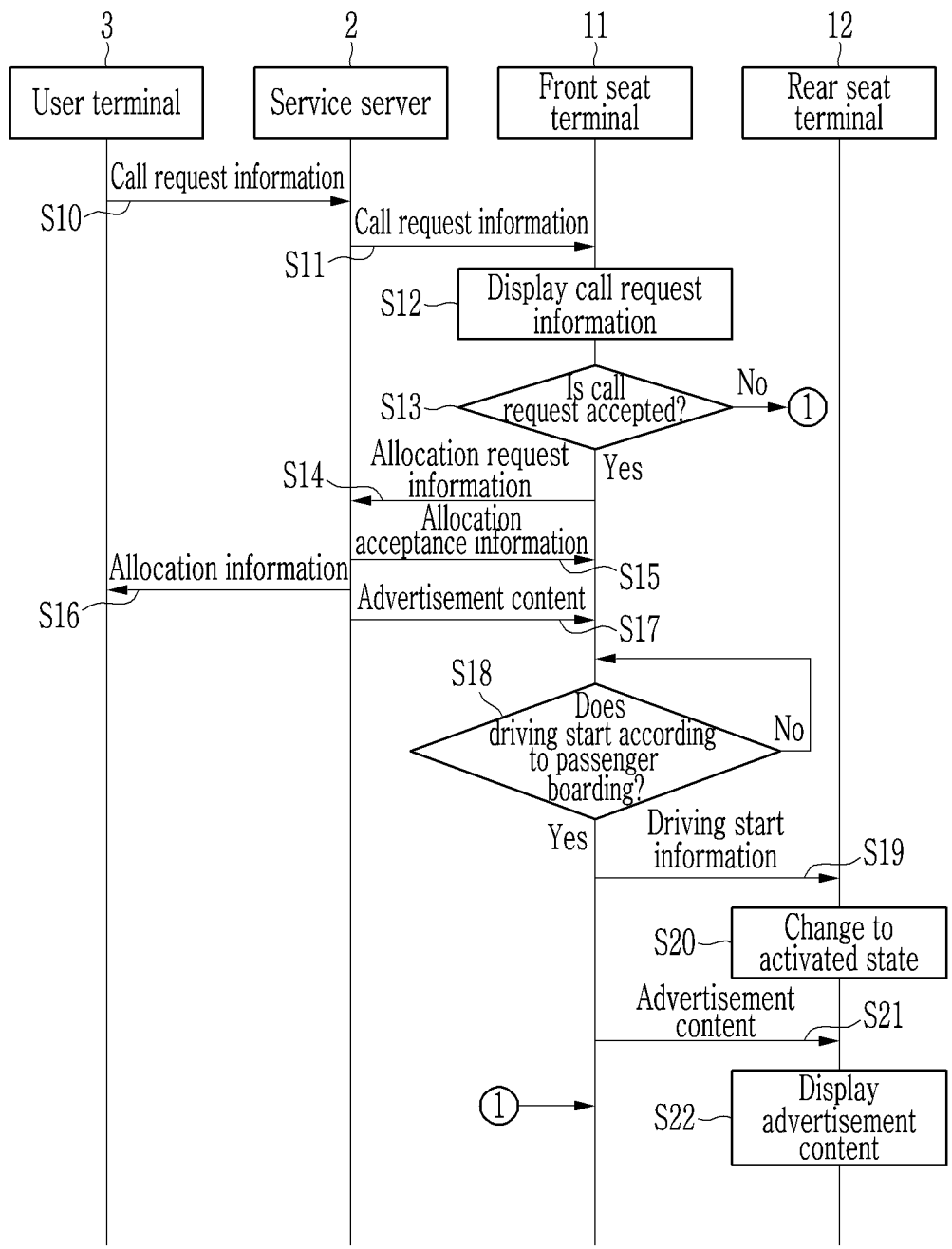
FIG. 5 is a diagram illustrating a media providing method in a taxi vehicle according to an exemplary embodiment.

FIG. 5 illustrates an advertisement providing method according to an exemplary embodiment. The advertisement providing method of FIG. 5 illustrates a method of providing an advertisement to a passenger boarding the taxi vehicle 1 using a call/allocation service.

Referring to FIG. 5, when the user intends to reserve the taxi vehicle 1 through the call/allocation service, the user terminal 3 may execute the call/allocation service app, and transmit the call request information to the service server 2 through the call/allocation service app (S10). The call request information transmitted from the user terminal 3 to the service server 2 may include departure place positional information, destination positional information, and the like of a user.

As the call request information is received from the user terminal 3, the service server 2 may transmit the call request information to the front seat terminal 11 of the taxi vehicle 1 registered in the service server 2 (S11). In the step S12, the service server 2 may select the taxi vehicles 1 positioned within a predetermined distance from the departure place or select the taxi vehicles 1 capable of arriving at the departure place within a predetermined time based on the departure positional information received from user terminal 3 and the positional information of the taxi vehicles 1. Then, the service server 2 may transmit the call request information received from the user terminal 3 only to the selected taxi vehicles 1.

As the call request information is received from the service server 2, the front seat terminal 11 of the taxi vehicle 1 may display the received call request information on the screen (S12). The front seat terminal 11 may display a selection button for accepting the call request together with departure place information, destination information, etc. when displaying the call request information.

When the driver selects (or touches) the acceptance button to accept the call request (S13), the front seat terminal 11 may transmit allocation request information requesting allocation in response to the call request to the service server 2 (S14). The service server 2 that has received the allocation request information may determine whether to accept the allocation of the taxi vehicle 1 that has transmitted the allocation request information, and when the allocation acceptance is determined for the taxi vehicle 1, may transmit the allocation acceptance information to the front seat terminal 11 of the taxi vehicle (S15). In addition, the service server 2 may transmit allocation information including information (vehicle number, driver information (name, phone number, photo, etc.), positional information, estimated arrival time to departure place, etc.) on the allocated taxi vehicle 1 to the user terminal 3 in response to the user's call request (S16).

The service server 2 may also transmit advertisement content to be provided to the user in the allocated taxi vehicle 1 to the front seat terminal 11 of the taxi vehicle 1 as the allocation is accepted (S17). In general, in order for users to reserve the taxi vehicle 1 through the call/allocation service app, the users need to first sign up for membership in the service server 2 that provides the call/allocation service. Accordingly, the service server 2 may determine that the user has subscribed to the service server 2 as a member when the user reserves the taxi vehicle 1 through the call/allocation service app. Accordingly, the advertisement content transmitted to the front seat terminal 11 of the taxi vehicle 1 in step S17 may include advertisement information for maintaining the existing members, for example, advertisement information on promotions related to service use. On the other hand, when the user who has requested a call to the service server 2 does not agree to the use of personal information for providing advertisement or advertisement exposure or when the driver of the allocated taxi vehicle 1 does not agree to provision of advertisement, step S17 in which the service server 2 provides advertisement content to the front seat terminal 11 of the taxi vehicle 1 may be omitted.

When the front seat terminal 11 of the taxi vehicle 1 receives the allocation acceptance information from the service server 2, the business mode of the taxi vehicle 1 changes to the boarding reservation mode, and the boarding of the reserved passenger may wait. When a user (passenger) reserved later boards the taxi vehicle 1 and the driving of the taxi vehicle 1 is started (S18), the front seat terminal 11 may transmit traveling start information to the rear seat terminal 12 (S19). When the driver of the taxi vehicle 1 starts driving after the passenger boards, the 'out-of-town' button or 'downtown' button that selects a basic fare for calculating the driving fee of the app meter module 115-1 may be selected. Therefore, in step S18, when the selection of the 'out-of-town' button or the 'downtown' button is detected, the front seat terminal 11 may identify that the taxi vehicle 1 has started driving for passenger transportation.

The rear seat terminal 12 of the taxi vehicle 1 may be changed to an activated state to provide information to the passenger as the traveling start information is received from the front seat terminal 11 (S20). After being changed to the activated state, the rear seat terminal 12 may receive the advertisement content received from the service server 2 from the front seat terminal 11 (S21). Then, the rear seat terminal 12 may display the received advertisement content on the screen of the rear seat terminal 12 (S22). The rear seat terminal 12 changed to the activated state may display information related to the driving of the taxi vehicle 1, such as driver information, route guidance information, and driving fee information, on the screen. Accordingly, in step S22, the rear seat terminal 12 may display advertisement content on the screen in the form of a banner.

Figure 6:
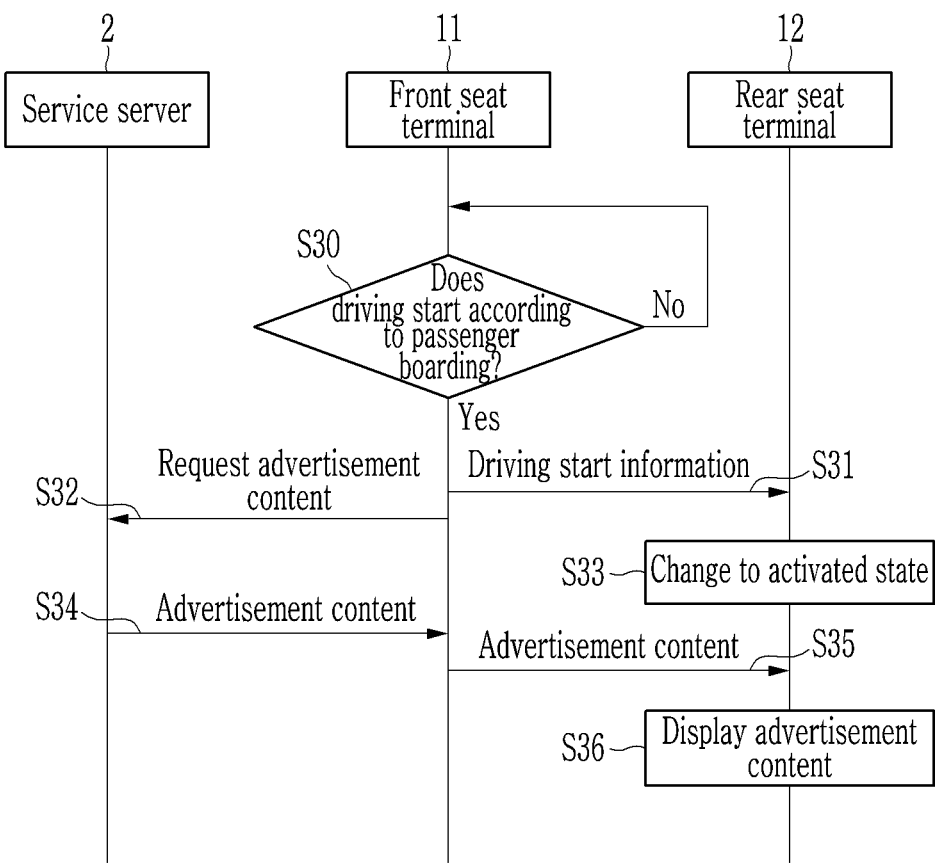
FIG. 6 is a diagram illustrating a media providing method in a taxi vehicle according to another exemplary embodiment.

FIG. 6 illustrates an advertisement providing method according to another exemplary embodiment. The advertisement providing method of FIG. 6 illustrates a method of providing an advertisement to a passenger boarding a taxi vehicle 1 through a general roaming business. The advertisement providing method of FIG. 6 may be performed by an advertisement providing system described with reference to FIGS. 1 to 4.

When the driver of the taxi vehicle 1 starts roaming business without a passenger on board, the driver may select an 'empty car' button on the app meter screen of the front seat terminal 11. In addition, the front seat terminal 11 of the taxi vehicle 1 detecting the selection of the 'empty car' button may set the business mode of the taxi vehicle 1 to the empty car mode. Even if the driver does not select the 'empty car' button, the front seat terminal 11 may receive the allocation acceptance information from the service server 2 and change a business mode of the taxi vehicle 1 to a boarding reservation mode, or may maintain the business mode of the taxi vehicle 1 to the empty car mode before the business mode of taxi vehicle 1 is changed to the boarding mode due to the boarding of the passenger. Accordingly, the front seat terminal 11 may determine that the taxi vehicle 1 is in the roaming business when the business mode of the taxi vehicle 1 is set to the empty car mode.

Referring to FIG. 6, when the passenger boards the taxi vehicle 1 that is in roaming business and the driving of the taxi vehicle 1 is started (S30), the front seat terminal 11 may transmit traveling start information to the rear seat terminal 12 (S31). The front seat terminal 11 may also transmit an advertisement content request to the service server 2 as the taxi vehicle 1 starts driving (S32). As in the case where the passenger boards the taxi vehicle 1 through the call/allocation service, even when the passenger boards during the roaming business, the driver of the taxi vehicle 1 may select an 'out-of-town' button or a 'downtown' button that selects a basic fare to calculate the driving fare of the app meter module 115-1 at the time of starting driving after the passenger boards. Therefore, in step S30, when the selection of the 'out-of-town' button or the 'downtown' button is detected, the front seat terminal 11 may identify that the taxi vehicle 1 has started driving for passenger transportation.

The rear seat terminal 12 of the taxi vehicle 1 may be changed to an activated state to provide information as the traveling start information is received from the front seat terminal 11 (S33). As the advertisement content is requested from the front seat terminal 11 of the taxi vehicle 1, the service server 2 may transmit the advertisement content to be exposed in the corresponding taxi vehicle 1 to the terminal 11 of the front seat terminal of the taxi vehicle 1 (S34). When the taxi vehicle 1, which is in the roaming business, requests advertisement contents due to the boarding of the passenger, the service server 2 may determine that the passenger is a user who is not subscribed to the service server 2 as a member. That is, when a request for advertisement content is received from the taxi vehicle 1 that is not allocated by the service server 2, it may be determined that the passenger boarding the taxi vehicle 1 is a user who is not subscribed to the service server 2 as a member. Accordingly, in step S34, the service server 2 may guide the service app download of the call/allocation service or the membership subscription method, or transmit the advertisement content related to the promotion related to the membership subscription to the front seat terminal 11 of the taxi vehicle 1.

After changing to the activated state, the rear seat terminal 12 may receive the advertisement content received from the service server 2 through the front seat terminal 11 (S35). Then, the rear seat terminal 12 may display the received advertisement content on the screen of the rear seat terminal 12 (S36). The rear seat terminal 12 changed to the activated state may display the information related to the driving of the taxi vehicle 1, such as driver information, route guidance information, and driving fee information, on the screen. Accordingly, in step S36, the rear seat terminal 12 may display advertisement content on the screen in the form of the banner.

On the other hand, the exemplary embodiment in which the rear seat terminal 12 receives the advertisement content of the service server 2 in a way that the front seat terminal 11 receives the advertisement content from the service server 2 and transmits the received advertisement content to the rear seat terminal 12 is described, by way of example, with reference to FIGS. 5 and 6, but is not limited thereto. In another exemplary embodiment, the rear seat terminal 12 may receive the traveling start information from the front seat terminal 11 and change to an activated state, and then directly receive the advertisement content from the service server 2.

Hereinafter, exemplary embodiments in which a passenger boarding the taxi vehicle 1 using a call/allocation service participates in the promotion will be described in detail with reference to FIGS. 7 and 8.

FIG. 7 illustrates a method in which a passenger boarding the taxi vehicle 1 participates in a promotion of the service server 2 using a call/allocation service according to an exemplary embodiment.

Referring to FIG. 7, as the rear seat terminal 12 of the taxi vehicle 1 receives the advertisement content provided by the service server 2, it is possible to display the advertisement content on its own screen in the form of a banner (S40). In this state, when the selection of the advertisement content by the passenger is detected (S41), the rear seat terminal 12 may request detailed information of the promotion included in the corresponding advertisement content from the service server 2 (S42). In step S41, the rear seat terminal 12 may determine that the advertisement content is selected when a touch input is detected for a specific area where the advertisement content is displayed on the screen of the rear seat terminal 12. The advertisement content received from the service server 2 may include link information for requesting detailed information of the promotion included in the advertisement content. In step S42, requesting the detailed information of the promotion may mean that the rear seat terminal 12 attempts to access a web page (or app screen) including the detailed information of the promotion based on this link information.

When the detailed information of the promotion is requested by the rear seat terminal 12, the service server 2 may transmit the detailed information of the promotion to the rear seat terminal 12 (S43). In step S43, receiving the detailed information of the promotion may mean receiving data for displaying a web page (or app screen) including the detailed information of the promotion. The rear seat terminal 12 may display the detailed promotion information of the promotion received from the service server 2 on its own screen (S44). The detailed information of the promotion may include information on a promotion participation method.

The rear seat terminal 12 may detect a touch input to the screen while the detailed screen of the promotion is displayed to determine whether the promotion participation is selected by a passenger (S45). When the promotion participation is selected by the passenger, the rear seat terminal 12 may transmit a request to participate in the promotion to the service server 2 (S46). When requesting to participate in the promotion, the rear seat terminal 12 may transmit the user information (e.g., name, phone number, etc.) of the passenger who requested the promotion participation to the service server 2.

The service server 2 receiving the user information may determine whether the passenger of the taxi vehicle 1 may participate in the corresponding promotion based on the received user information (S47). That is, the service server 2 may perform a self-authentication procedure based on the received user information, and identify whether a user can participate in the promotion by checking whether the participation qualification for the promotion is satisfied, whether or not to participate in a promotion repeatedly, etc.

When the passenger of the taxi vehicle 1 is a user who can participate in the promotion, the service server 2 may pay a coupon/point paid in the promotion to the user (S48). Then, the service server 2 may update the user information stored in the service server 2 based on the coupon/point information paid to the user, and transmit the coupon/point payment information to the rear seat terminal 12 (S49). The rear seat terminal 12 that has received the coupon/point payment information may display the received coupon/point payment information on the screen (S5o). The coupon/point paid through step S48 may be used immediately by the selection of the passenger who received them, or used when using the next call/allocation service.

When the immediate use of the coupon/point paid by the passenger is requested (S51), the immediate use of the paid coupon/point may be requested from the service server 2 (S52). The service server 2 may transmit the coupon/point information to be immediately used to the front seat terminal 11 as the immediate use of the coupon/point paid to the passenger by the rear seat terminal 12 is requested (S53). Accordingly, the front seat terminal 11 may calculate the payment fee of the passenger by reflecting the coupon/point requested for immediate use (S54).

FIG. 8 illustrates a method in which the passenger boarding the taxi vehicle 1 participates in the promotion of the service server 2 using the call/allocation service according to an exemplary embodiment.

Referring to FIG. 8, as the rear seat terminal 12 of the taxi vehicle 1 receives the advertisement content provided by the service server 2, the rear seat terminal 12 may display the received advertisement content on its own screen (S6o). The advertisement content received from the service server 2 may include a quick response code (QR code). The link information for accessing the web page (or app screen) including the detailed information of the promotion included in the advertisement content may be mapped to the QR code included in the advertisement content. When the user terminal 3 of the passenger recognizes the QR code of the advertisement content displayed on the rear seat terminal 12 through its own camera (S61), the user terminal 3 may acquire the link information mapped to the QR code. Then, the user terminal 3 may request the detailed information of the promotion included in the advertisement content from the service server 2 based on the link information acquired through the QR code recognition (S62). Requesting the detailed information of the promotion in step S62 means that the user terminal 3 attempts to access the web page (or app screen) including the detailed information of the promotion based on the link information acquired through the QR code recognition. For example, the user terminal 3 may execute the service app for the corresponding call/allocation service in order to request the detailed information of the promotion, and may attempt to access the app screen including the detailed information of the promotion through the service app.

When the detailed information of the promotion is requested by the user terminal 3, the service server 2 may transmit the detailed information of the corresponding promotion to the user terminal 3 (S63). Then, the user terminal 3 receiving the detailed information of the promotion may display the detailed information of the promotion on its own screen (S64). The detailed information of the promotion may include information on the promotion participation method.

The user terminal 3 may detect the touch input to the screen on which the detailed information of the promotion is displayed to determine whether the promotion participation is selected by a passenger (S65). When the promotion participation is selected by the passenger, the user terminal 3 may transmit a request to participate in the promotion to the service server 2 (S66). When requesting to participate in the promotion, the user terminal 3 may transmit the user information (e.g., name, phone number, etc.) of the passenger who requested the promotion participation to the service server 2.

The service server 2 receiving the user information may determine whether the corresponding user can participate in the promotion based on the received user information (S67). That is, the service server 2 may perform a self-authentication procedure based on the received user information, and identify whether a user can participate in the promotion by checking whether the participation qualification for the promotion is satisfied, whether or not to participate in a promotion repeatedly, etc.

When the corresponding user is a user who can participate in the promotion, the service server 2 may provide the coupon/point paid in the promotion to the corresponding user (S68). Then, the service server 2 may update the user information stored in the service server 2 based on the coupon/point information paid to the user, and transmit the coupon/point payment information to the user terminal 3 (S69). The coupon/point paid through step S68 may be used immediately by the selection of the user who received them, or used when using the next call/allocation service.

The user terminal 3 that has received the coupon/point payment information may display the received coupon/point payment information on the screen (S70). When the immediate use of the coupon/point paid by the passenger is requested (S71), the immediate use of the paid coupon/point may be requested from the service server 2 (S72). The service server 2 may transmit the coupon/point information to be immediately used to the front seat terminal 11 of the taxi vehicle 1 as the immediate use of the coupon/point paid to the passenger by the user terminal 3 is requested (S73). Accordingly, the front seat terminal 11 may calculate the payment fee by reflecting the coupon/point requested for immediate use (S74).

FIG. 9 illustrates a method for a user to subscribe to the service server 2 as a member according to an exemplary embodiment.

Referring to FIG. 9, the rear seat terminal 12 of the taxi vehicle 1 may receive advertisement content from the service server 2 when a passenger boards during the general roaming business of the taxi vehicle 1 and display the received advertisement content on its own screen (S8o). In step S8o, the service server 2 that provides the call/allocation service may provide, to the taxi vehicle 1 which the passenger boards during the general roaming business, the advertisement content that includes the QR code mapped to the link information that may download the call/allocation service app and a recommendation code that may be input at the time of the membership subscription.

The passenger checking the advertisement content through the rear seat terminal 12 may recognize the QR code included in the advertisement content through the camera of its own user terminal 3. The user terminal 3 may acquire the link information mapped to the QR code through the QR code recognition, and download the call/allocation service app based on the acquired link information to install the call/allocation service app in the user terminal 3 (S81). Thereafter, when the membership subscription for the call/allocation service is requested from the user through the installed call/allocation service app (S82), the user terminal 3 may request the membership subscription from the service server 2 (S83). When the membership subscription is requested from the service server 2, the user terminal 3 may transmit the recommendation code acquired from the advertisement content displayed on the rear seat terminal 12 of the taxi vehicle 1 together with the user information (name, phone number, e-mail, etc.) input from the user.

The service server 2 receiving the membership subscription request from the user terminal 3 may check whether the corresponding user is an existing member based on the received user information (S84). When the corresponding user is not an existing member, the service server 2 may perform a membership subscription procedure for the user (S85). Thereafter, when the membership subscription procedure is completed (S86), the service server 2 may provide a coupon/point according to the membership subscription to the user based on the recommendation code received from the user terminal 3 (S87). In step S87, the service server 2 may differentially pay coupons/points according to whether the user who requested the membership subscription is a new member or a rejoining member.

After the completion of the membership subscription procedure, the service server 2 may transmit the information indicating that the membership subscription is completed to the user terminal 3 (S88). As the membership subscription completion information is received from the service server 2, the user terminal 3 may display the membership subscription completion information on the screen through a call/allocation service app (S89).

According to the above-described exemplary embodiments, when it is desired to advertise the call/allocation service to the passenger boarding the taxi vehicle, the advertisement content for attracting new customers or the advertisement content for maintaining existing customers may be appropriately provided according to a boarding type (boarding using call/allocation service, or boarding during roaming business) of a passenger.

The advertisement providing method in the taxi vehicle according to the above-described exemplary embodiment may be executed through software. When executed in software, the constituent means of embodiments of the present invention are code segments that perform the necessary tasks. The program or code segments may be stored in a processor-readable recording medium or transmitted by a computer data signal coupled with a carrier wave in a transmission medium or a communication network.

The computer-readable recording medium includes all types of recording devices in which data readable by a computer system is stored. Examples of the computer-readable recording medium include ROM, RAM, CD-ROM, DVD_ROM, DVD_RAM, magnetic tape, floppy disk, hard disk, optical data storage device, or the like. In addition, the computer-readable recording medium may be distributed to network-connected computer devices to store and execute computer-readable codes in a distributed manner.

The accompanying drawings and the detailed description have not been used in order to limit the meaning or limit the scope of the present invention stated in the claims, but have been used only in order to illustrate the present invention. Therefore, the present invention may be easily selected and replaced by those of ordinary skill in the art. In addition, those skilled in the art may omit some of the components described herein without degrading performance or add components to improve performance. In addition, those skilled in the art may change the order of the method steps described herein according to the process environment or equipment. Accordingly, the scope of the present invention should be determined by the claims and their equivalents rather than the described embodiments.

What is claimed is:

1. A terminal system of a taxi vehicle, the terminal system comprising:
    a first terminal located in a rear seat area of the taxi vehicle, the first terminal comprising a communication device, a storage device storing a call/allocation app, and a control device; and
    a second terminal located in a front seat area of the taxi vehicle and configured to receive media content provided from a server that determines and provides a call/allocation service, wherein the media content is based on whether a passenger used the call/allocation service to board the taxi vehicle;
    wherein the call/allocation app is configured to cause the control device of the first terminal to:
        in response to the passenger in the taxi vehicle using the call/allocation service to board the taxi vehicle, receive a first media content through a communication device of the second terminal from the server, the first media content comprising information on a promotion; and
        in response to the passenger in the taxi vehicle not using the call/allocation service to board the taxi vehicle, receive a second media content through the communication device of the second terminal from the server, the second media content comprising information on a member registration guide for the call/allocation service or a promotion related to a membership subscription of the call/allocation service;
    wherein one of the first media content and the second media content is transmitted to the first terminal from the second terminal;
    wherein the first terminal is configured to:
        instruct the second terminal to display the first media content on a screen of the second terminal or display the second media content on the screen of the second terminal;
        offer the passenger a choice to use a coupon/point offered in the promotion either during the call/allocation service or during a future call/allocation service;
        receive a passenger selection indicating whether the coupon/point offered in the promotion is to be used during the call/allocation service or during the future call/allocation service;
        in response to a passenger selection to use the coupon/point offered in the promotion during the call/allocation service, request immediate use of the coupon/point to the server, and
        in response to the passenger selection to use the coupon/point offered in the promotion during the future call/allocation service, request future use of the coupon/point to the server; and
    wherein the second terminal is configured to receive, from the server, the coupon/point to be immediately used in response to the passenger selection and the second terminal calculates a payment fee of the passenger by reflecting the coupon/point requested for immediate use.

2. The terminal system of claim 1, wherein the second terminal is configured to:
receive a call request from the server; and
manage allocation of the taxi vehicle based on reception of the call request.

3. The terminal system of claim 2, wherein in response to the allocation for the taxi vehicle being determined by the server, the second terminal is configured to:
receive call information comprising departure place or destination information from the server; and
identify whether the passenger in the taxi vehicle used the call/allocation service to board the taxi vehicle based on whether the call information is received.

4. The terminal system of claim 2, wherein:
the second terminal is configured to display a plurality of selection buttons for determining a basic fare on the screen of the second terminal; and
the first terminal is configured to display the media content on a screen of the first terminal in response to a selection of any one of the plurality of selection buttons being detected by the second terminal.

5. The terminal system of claim 4, wherein in response to the selection of any one of the plurality of selection buttons being detected by the second terminal in a state in which a business mode of the taxi vehicle is set to an empty car mode, the first terminal is configured to display the second media content related to the membership subscription of the call/allocation service on the screen of the first terminal.

6. The terminal system of claim 4, wherein in response to the selection of any one of the plurality of selection buttons being detected by the second terminal in a state in which the taxi vehicle is not allocated by the server, the first terminal is configured to display the second media content related to the membership subscription of the call/allocation service on the screen of the first terminal.

7. The terminal system of claim 4, wherein in response to the selection of any one of the plurality of selection buttons being detected by the second terminal, the first terminal is configured to change to an activated state and display the media content.

8. The terminal system of claim 7, wherein the second terminal is configured to:
receive the media content from the server; and
transmit the received media content to the first terminal in response to the first terminal being in the activated state.

9. The terminal system of claim 1, wherein in response to the server determining allocation of the taxi vehicle in response to a call request, the first terminal is configured to receive the first media content from the server.

10. The terminal system of claim 9, wherein the promotion comprises a discount event related to the use of the call/allocation service, a coupon payment event, or a point payment event.

11. A taxi vehicle comprising:
the terminal system of claim 2;
a rear seat within the taxi vehicle, wherein the first terminal is located to be accessible from the rear seat; and
a front seat within the taxi vehicle, wherein the second terminal is located in to be accessible from the front seat.

12. The taxi vehicle of claim 11, wherein in response to the call/allocation service for the taxi vehicle being determined by the server, the second terminal is configured to:
receive call information comprising departure place or destination information from the server; and
identify whether the passenger in the taxi vehicle used the call/allocation service to board the taxi vehicle based on whether the call information is received.

13. The taxi vehicle of claim 11, wherein:
the second terminal is configured to display a plurality of selection buttons for determining a basic fare on the screen of the second terminal; and
the first terminal is configured to display the media content on a screen of the first terminal in response to a selection of any one of the plurality of selection buttons being detected by the second terminal.

14. The taxi vehicle of claim 11, wherein in response to the server determining allocation of the taxi vehicle in response to a call request, the first terminal is configured to receive the first media content from the server.

15. A method of providing media in a taxi vehicle that comprises a front seat terminal and a rear seat terminal, the front seat terminal and the rear seat terminal comprising a communication device, a storage device storing a call/allocation app, and a control device executing the call/allocation app, the method comprising:
exchanging information between the front seat terminal and the rear seat terminal;
when the taxi vehicle is allocated to a passenger by a server, receiving, by the rear seat terminal, a first media content related to a use of a call/allocation service from the front seat terminal and displaying the first media content on a screen of the rear seat terminal, the first media content comprising information on a promotion comprising a discount event related to the use of the call/allocation service, a coupon payment event, or a point payment event; and
when the taxi vehicle is allocated to the passenger without being notified by the server,
receiving, by the rear seat terminal, second media content related to a membership subscription for the call/allocation service from the front seat terminal and displaying the second media content on the screen of the rear seat terminal, the second media content comprising information on a member registration guide for the call/allocation service or a promotion related to the membership subscription of the call/allocation service;
guiding the passenger to sign up for membership or providing the promotion related to the membership subscription via the rear seat terminal;
offering, at the rear seat terminal, the passenger a choice to use a coupon/point offered in the promotion either during the call/allocation service or during a future call/allocation service;
receiving, from the rear seat terminal, a passenger selection indicating whether the coupon/point offered in the promotion is to be used during the call/allocation service or during the future call/allocation service;
in response to the passenger selection to use the coupon/point offered in the promotion during the future call/allocation service, requesting, by the rear seat terminal, future use of the coupon/point to the server; and
in response to the passenger selection to use the coupon/point offered in the promotion during the call/allocation service:
requesting, by the rear seat terminal, immediate use of the coupon/point to the server, transmitting, by the server, the coupon/point to be immediately used to the front seat terminal in response to the passenger selection, and calculating, by the front seat terminal, a payment fee of the passenger by reflecting the coupon/point requested for immediate use.

16. The method of claim 15, further comprising:
receiving a call request from the server;
detecting an acceptance input for the call request;
transmitting an allocation request to the server;
in response to the taxi vehicle being allocated by the server in response to the call request, receiving the first media content from the server; and
transmitting the first media content.

17. The method of claim 15, further comprising:
displaying a plurality of selection buttons for determining a basic fare on a second screen of the front seat terminal;
detecting a selection of any one of the plurality of selection buttons; and
activating the rear seat terminal by the front seat terminal in response to detecting the selection of any one of the plurality of selection buttons.

18. The method of claim 17, further comprising:
receiving the second media content related to the membership subscription of the call/allocation service from the server in response to detecting the selection of any one of the plurality of selection buttons in a state in which a business mode of the taxi vehicle is set to an empty car mode; and
transmitting the second media content to the rear seat terminal, wherein displaying the media content comprises displaying the second media content on the screen of the rear seat terminal.

19. The method of claim 17, further comprising:
receiving the second media content related to the membership subscription of the call/allocation service from the server in response to detecting the selection of any one of the plurality of selection buttons in a state in which the taxi vehicle is not allocated by the server; and
transmitting the second media content to the rear seat terminal, wherein displaying the media content comprises displaying the second media content on the screen of the rear seat terminal.

20. A system comprising:
a terminal system of a taxi vehicle, the terminal system comprising a communication device, a storage device storing a call/allocation app, a screen, a front seat terminal, and a rear seat terminal located in the taxi vehicle; and
a server configured to determine an allocation of the taxi vehicle by a passenger, the server comprising a storage device and a control device, wherein the server is remote from and in communication with the terminal system through the communication device, and wherein the storage device of the server is configured to store a program for a call/allocation service;
wherein the terminal system is configured to:
exchange information between the front seat terminal and the rear seat terminal;
when the server determines the allocation of the taxi vehicle by the passenger, receive, by the rear seat terminal, a first media content related to a use of the call/allocation service from the front seat terminal and display the first media content on the screen, the first media content comprising information on a promotion comprising a discount event related to the use of the call/allocation service, a coupon payment event, or a point payment event; and
when the taxi vehicle is in a roaming state,
receive, by the rear seat terminal, a second media content related to a membership subscription for the call/allocation service from the front seat terminal and display the second media content on the screen, the second media content comprising information on a member registration guide for the call/allocation service or a promotion related to the membership subscription of the call/allocation service; and
guide the passenger to sign up for a membership or provide the promotion related to the membership subscription via the rear seat terminal;
wherein the rear seat terminal is configured to:
offer the passenger a choice to use a coupon/point offered in the promotion either immediately or at a future call/allocation service;
receive a passenger selection indicating whether the coupon/point offered in the promotion is to be used during the call/allocation service or during the future call/allocation service,
in response to the passenger selection to use the coupon/point offered in the promotion during the future call/allocation service, request future use of the coupon/point to the server, and
in response to a passenger selection to use the coupon/point offered in the promotion during the call/allocation service, request immediate use of the coupon/point to the server;
wherein the server is configured to transmit the coupon/point to be immediately-used to the front seat terminal in response to a passenger selection to use the promotion during the call/allocation service; and
wherein the front seat terminal is configured to calculate a payment fee of the passenger by reflecting the coupon/point requested for immediate use.

* * * * *

UNITED STATES PATENT AND TRADEMARK OFFICE
CERTIFICATE OF CORRECTION

| | | |
|---|---|---|
| PATENT NO. | : 12,141,839 B2 | Page 1 of 1 |
| APPLICATION NO. | : 17/572969 | |
| DATED | : November 12, 2024 | |
| INVENTOR(S) | : Sojeong Kim | |

It is certified that error appears in the above-identified patent and that said Letters Patent is hereby corrected as shown below:

In the Claims

In Column 24, in Claim 20, Line 23, delete "ona" and insert -- on a --.

Signed and Sealed this
Thirty-first Day of December, 2024

Derrick Brent
*Acting Director of the United States Patent and Trademark Office*